(12) United States Patent
Alberth, Jr. et al.

(10) Patent No.: US 9,110,450 B2
(45) Date of Patent: Aug. 18, 2015

(54) SYSTEMS, DEVICES, AND METHODS FOR DYNAMICALLY ASSIGNING FUNCTIONS TO AN ACTUATOR

(71) Applicant: Green Edge Technologies, Inc., Poway, CA (US)

(72) Inventors: William P. Alberth, Jr., Prairie Grove, IL (US); Seang Yong Chau, Los Altos, CA (US); David K. Hartsfield, Poway, CA (US); William Rice, San Diego, CA (US); Scott A. Steele, Poway, CA (US)

(73) Assignee: Green Edge Technologies, Inc., Poway, CA (US)

( * ) Notice: Subject to any disclaimer, the term of this patent is extended or adjusted under 35 U.S.C. 154(b) by 73 days.

(21) Appl. No.: 13/830,423

(22) Filed: Mar. 14, 2013

(65) Prior Publication Data
US 2014/0266600 A1    Sep. 18, 2014

(51) Int. Cl.
| | | |
|---|---|---|
| *H04B 3/00* | (2006.01) | |
| *H04Q 5/22* | (2006.01) | |
| *G08C 19/16* | (2006.01) | |
| *G08B 9/00* | (2006.01) | |
| *G06K 9/00* | (2006.01) | |
| *G05B 11/01* | (2006.01) | |
| *G06F 21/32* | (2013.01) | |
| *G05B 15/02* | (2006.01) | |

(52) U.S. Cl.
CPC ............... *G05B 11/01* (2013.01); *G05B 15/02* (2013.01); *G06F 21/32* (2013.01); *G06K 9/00288* (2013.01)

(58) Field of Classification Search
CPC ............. H04B 3/54; H04B 2203/5416; H04B 2203/5445; G06K 7/0008; Y04S 40/121

USPC ......... 340/5.83, 10.3, 12.32, 286.02; 382/118
See application file for complete search history.

(56) References Cited

U.S. PATENT DOCUMENTS

| | | | |
|---|---|---|---|
| 5,760,558 | A | 6/1998 | Popat |
| 5,877,957 | A | 3/1999 | Bennett |
| 6,112,127 | A | 8/2000 | Bennett |
| 6,385,495 | B1 | 5/2002 | Bennett |
| 6,400,996 | B1 | 6/2002 | Hoffberg et al. |
| 6,418,424 | B1 | 7/2002 | Hoffberg et al. |
| 6,912,429 | B1 * | 6/2005 | Bilger ............................ 700/19 |
| 7,336,192 | B2 | 2/2008 | Aisa |

(Continued)

FOREIGN PATENT DOCUMENTS

| | | |
|---|---|---|
| EP | 2 492 763 A1 | 8/2012 |
| WO | WO 2012/018526 A1 | 2/2012 |

OTHER PUBLICATIONS

PCT International Search Report for corresponding International Application No. PCT/US2013/068974 and Written Opinion mailed on Feb. 18, 2014 (12 pages).

*Primary Examiner* — George Bugg
*Assistant Examiner* — Munear Akki
(74) *Attorney, Agent, or Firm* — Bookoff McAndrews, PLLC

(57) ABSTRACT

The present disclosure is generally directed to systems and methods for dynamically adjusting functions of an automation system. More particularly, the present disclosure includes systems, devices, and methods for intelligently controlling one or more energy-consuming devices in a structure such as a residential, commercial, or industrial building. One embodiment include determining an identity of a person and/or the direction the person is traveling, and then changing a function of an actuator based on the determination(s).

25 Claims, 5 Drawing Sheets

(56) References Cited

U.S. PATENT DOCUMENTS

| | | | |
|---|---|---|---|
| 7,339,466 B2 | 3/2008 | Mansfield et al. | |
| 7,406,353 B2 | 7/2008 | Bennett | |
| 7,480,746 B2 | 1/2009 | Simon et al. | |
| 7,813,831 B2 | 10/2010 | McCoy et al. | |
| 7,860,679 B2 | 12/2010 | Rouhier et al. | |
| 7,865,252 B2 | 1/2011 | Clayton | |
| 8,024,073 B2 | 9/2011 | Imes et al. | |
| 8,094,034 B2 | 1/2012 | Patel et al. | |
| 8,134,310 B2 | 3/2012 | Wacknov et al. | |
| 8,183,995 B2 | 5/2012 | Wang et al. | |
| 8,185,250 B2 | 5/2012 | Sato | |
| 8,190,275 B2 | 5/2012 | Chang | |
| 8,214,671 B2 | 7/2012 | Boss et al. | |
| 8,234,363 B1 | 7/2012 | Kuo | |
| 8,248,230 B2 | 8/2012 | Covaro et al. | |
| 8,334,784 B2 | 12/2012 | Patel et al. | |
| 8,436,541 B2 * | 5/2013 | Olson | 315/149 |
| 2002/0035404 A1 | 3/2002 | Ficco et al. | |
| 2002/0149891 A1 | 10/2002 | Neiger et al. | |
| 2004/0138981 A1 | 7/2004 | Ehlers | |
| 2007/0155349 A1 * | 7/2007 | Nelson et al. | 455/128 |
| 2007/0291998 A1 * | 12/2007 | Takizawa et al. | 382/118 |
| 2009/0067294 A1 * | 3/2009 | Haupt et al. | 368/14 |
| 2009/0072985 A1 | 3/2009 | Patel et al. | |
| 2010/0171430 A1 | 7/2010 | Seydoux | |
| 2010/0188229 A1 | 7/2010 | Nhep | |
| 2010/0237711 A1 * | 9/2010 | Parsons | 307/116 |
| 2010/0280667 A1 | 11/2010 | Steinberg | |
| 2010/0305773 A1 | 12/2010 | Cohen | |
| 2011/0090042 A1 | 4/2011 | Leonard et al. | |
| 2011/0133649 A1 * | 6/2011 | Kreiner et al. | 315/86 |
| 2011/0313582 A1 | 12/2011 | Van Megen et al. | |
| 2011/0316355 A1 * | 12/2011 | Gruber et al. | 307/326 |
| 2012/0082461 A1 * | 4/2012 | Meyer et al. | 398/106 |
| 2013/0030732 A1 | 1/2013 | Shetty et al. | |
| 2013/0331027 A1 * | 12/2013 | Rose et al. | 455/41.1 |
| 2014/0062728 A1 * | 3/2014 | Soto et al. | 340/937 |

* cited by examiner

| | | |
|---|---|---|
| 510 | Mike walking out, empty house | Turn off all lights inside house, trigger garage door light |
| 520 | Johnny walking out | Trigger garage door light, turn on outside lights |
| 530 | Julie walking in, house was empty, before 10pm | Turn on lights in kitchen and entry way |
| 540 | Julie walking in, house was empty, after 10pm | Turn on lights between garage and master bedroom |
| 550 | default | Toggle entryway light |

SYSTEMS, DEVICES, AND METHODS FOR DYNAMICALLY ASSIGNING FUNCTIONS TO AN ACTUATOR

DESCRIPTION OF THE INVENTION

1. Field of the Invention

The present disclosure is generally directed to systems, devices, and methods for dynamic and automatic or selective assignment or reassignment of functions to actuators. More particularly, the present disclosure is directed to determining and assigning functions to switches (e.g., electrical power switches) in an intelligent building automation system

2. Background of the Invention

Conventional automation systems have been available in the marketplace for many years. For example, the internationally-known X10 standard was one of the first standards commercialized for automating systems within a home, office, school, or other structure. The X10 standard enables commands to be sent over the existing wiring in a structure, so that a controller can send messages to a controlled device. That is, one or more devices may communicate with one another over existing electrical wiring using the X10 standard. Existing X10 standard devices generally require a user to manually set an address on each switch and outlet of a system, wherein a switch with a given address supplies or terminates power to a corresponding outlet pre-set with the identical address.

Recent efforts to conserve energy have sparked additional interest in home automation. The existing and available solutions in the prior art, however, may require large expenditures of capital and/or expert domain knowledge to facilitate installation. Existing technologies are further limited by the fact that conventional switches and controls function in the same way regardless of an identity of an individual activating the switch. In other words, a conventional light switch functions exactly the same regardless of who is activating (e.g., toggling) the switch, what time of day the switch is toggled, or the type of load the switch currently controls, etc. Such inflexible and non-discriminatory control assignments for conventional switches or other actuators does not allow for preferences of different users or differing modes of operation for differing loads.

Thus, there remains a need for improved and cost-effective methods and systems for dynamically assigning functions (either automatically or selectively) to the switches and controls of an automation system.

SUMMARY OF THE INVENTION

The present disclosure is generally directed to systems and methods of dynamically mapping components of an automation system. More particularly, the present disclosure includes systems, devices, and methods for intelligently controlling one or more energy-consuming devices and/or other components in a structure such as a residential, commercial, or industrial building.

The present disclosure is generally directed to systems and methods for dynamically adjusting functions of an automation system. More particularly, the present disclosure includes systems, devices, and methods for intelligently controlling one or more energy-consuming devices in a structure such as a residential, commercial, or industrial building. One embodiment include determining an identity of a person and/or the direction the person is traveling, and then changing a function of an actuator based on the determination(s).

Various embodiments of the method may include one or more of the following features the information obtained includes identifying characteristics of the user that has actuated the actuator; the at least one sensor includes a camera, and the information includes an image of the user's face; the information obtained includes information relating to clothing worn by the user; further comprising obtaining information relating to a time of day; the information obtained includes a direction of travel of the user; further comprising determining whether additional users are located within the structure; further comprising obtaining information relating to weather outside the structure; the actuator includes a display, wherein the display is configured to show the user at least two functions capable of being assigned to the actuator, wherein at least one of the functions is determined by the obtained information; assignment of a function to an actuator is preprogrammed into the automation system; the actuator is a switch that controls the delivery of electrical energy to an outlet or electrical device; the at least one sensor is configured to detect a signal from a device carried by the user; the signal includes identifying characteristics of the user; and obtaining information includes detecting signals emitted by a mobile device carried by the user.

Another embodiment of the present disclosure may include a method of changing a function of an actuator of an automation system of a structure. The method may include the steps of assigning a first function to the actuator, wherein the actuator includes an electrical switch and the function includes controlling delivery of electrical energy to a first electrical device of the structure, wherein activating the actuator a first time interrupts delivery of electrical energy to the first electrical device, and wherein activating the actuator a second time re-enables delivery of electrical energy to the first electrical device; obtaining information relating to one or more users associated with the structure; and assigning a second function to the actuator based on the obtained information, wherein the second function includes controlling delivery of electrical energy to a second electrical device of the structure.

Various embodiments of the method may include one or more of the following features the automation system includes at least one sensor; the information obtained includes identifying characteristics of a user that has actuated the actuator; the at least one sensor includes a camera, and the information includes an image of the user's face; the information obtained includes information relating to clothing worn by a user; further comprising obtaining information relating to a time of day; the information obtained includes a direction of travel of the user within the structure; further comprising obtaining information relating to weather outside the structure; the actuator includes a display, wherein the display is configured to show the user at least two functions capable of being assigned to the actuator, wherein least one of the functions is determined by the obtained information; the at least one sensor is configured to detect a signal from a device carried by the user; the device is a mobile phone; the signal includes identifying characteristics of the user; the first electrical device includes at least one light emitting device coupled to a first electrical outlet controlled by the actuator; and wherein, if the at least one light emitting device is decoupled from the first electrical outlet and coupled to a second electrical outlet different from the first electrical outlet, the automation system is configured to reconfigure the actuator to continue controlling the light emitting device.

In a further embodiment, the present disclosure includes a method of identifying a person and changing the function of a control (e.g., an electrical actuator) based in part on the identity of the person.

Various embodiments of the method may include one or more of the following features: collecting data on weather from the internet or from weather sensors connected to an automation system; tracking the vector that at least one person is traveling before and/or after a switch is activated; determining an identity of an individual activating a switch. Further, based on at least part of the determined or tracked data, a switch or other actuator may change a function controlled by switch.

In another embodiment, the present disclosure may comprise an automation system with a control unit, one or more switches, and one or more outlets. The switches may be disposed remotely of the control unit and the outlets. Similarly, the outlets may be disposed remotely of the control unit.

Embodiments of the present disclosure are directed to systems, devices, and methods for intelligently and/or selectively controlling one or more control devices or actuators (e.g., electrical switches) in a structure, including, but not limited to, a home, office, hospital, sporting complex, or school.

Various embodiments of a disclosed automation system may include one or more of the following features: an outlet including an adaptor configured to be operably coupled with a preexisting electrical outlet, wherein the preexisting outlet may be disposed in a wall of a structure; at least one sensor, wherein in some embodiments, the at least one sensor may include a plurality of sensors; the at least one sensor may include one of a motion sensor, light sensor, and a temperature sensor; and the outlet may include a microprocessor.

It may be understood that both the foregoing general description and the following detailed description are exemplary and explanatory only, and are not restrictive of the disclosure, as claimed. The present invention will be more clearly understood from the detailed description below in conjunction with the accompanying drawings.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 5 shows a table of possible dynamic assignments for an actuator, in accordance with an embodiment of the present disclosure.

DETAILED DESCRIPTION

Figure 1:
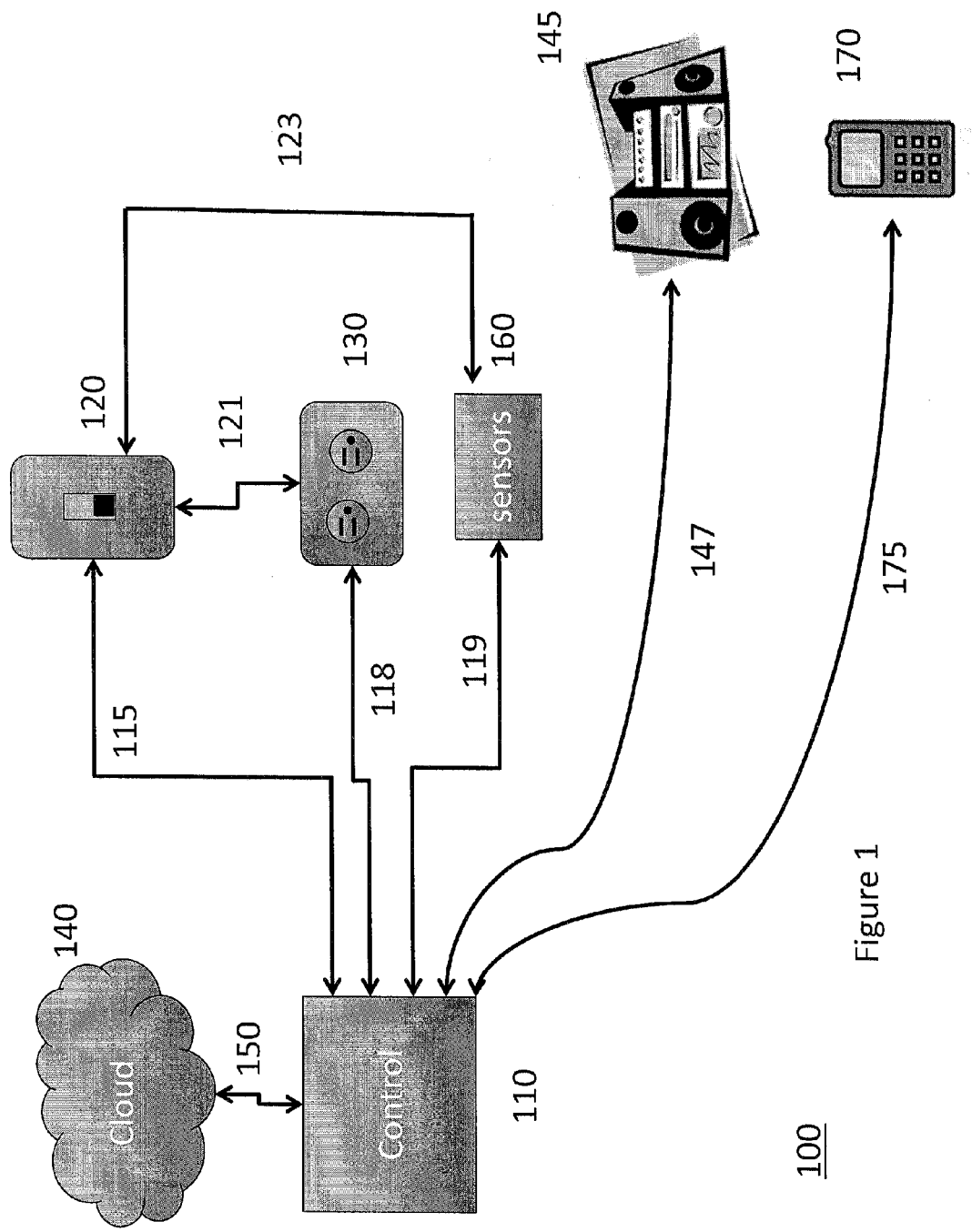
FIG. 1 schematically illustrates an exemplary automation system, in accordance with an embodiment of the present disclosure.

Reference now will be made in detail to embodiments of the present disclosure, examples of which are illustrated in the accompanying drawings. Wherever possible, the same reference numbers will be used throughout the drawings to refer to the same or like parts and/or components.

Overview

An automation system, e.g., a home automation system, may include one or more switches and one or more outlets, with the user selectively desiring which light fixtures, appliances, outlet or outlets, or other power delivery/consumption components are controlled by the switch(s). Existing X10 systems require a user to manually set an address on a switch and an outlet for which control of the outlet by the switch is desired. The outlet then would respond to a correspondingly programmed switch or switches having an identical address. The switch may be configured to selectively control delivery of electrical energy to the programmed outlet.

Embodiments of the present disclosure include, among other things, an automation system. Examples of suitable systems and components or features thereof include those described in U.S. application Ser. No. 13/672,534, filed Nov. 8, 2012, the entire disclosure of which is incorporated by reference herein. Systems according to the present disclosure may be used in, e.g., residential, commercial, educational, and/or industrial structures. Non-limiting examples include single-family and multi-family dwellings, condominium units, apartments, apartment buildings, offices, office buildings, schools, churches or other places of worship, sporting complexes, shopping centers, and manufacturing facilities.

The present disclosure allows a user to benefit from the functions of a switch or other actuator being selectively or automatically changed based on an identity of or other unique information associated with a user activating the control, the time of day, day of week, the weather, a user's direction of travel, the presence of others at the location, and/or the type of load the switch or actuator controls, etc. Other data to be considered will be evident to those skilled in the art. A function of a switch or other actuator may be also automatically changed or reset based on identified patterns of a user's behavior, as described in greater detail below.

The present disclosure may be further understood with reference to the embodiments shown in FIGS. 1-5. In the embodiment shown in FIG. 1, for example, the automation system 100 includes at least one outlet 130, which can be locally or remotely controlled by, e.g., a switch 120, as discussed below. The outlet 130 may be configured to monitor the power consumed by one or more devices (e.g., appliances) or loads to the outlet and/or selectively control power delivered by the outlet 130 to the devices or loads connected thereto. The system 100 further includes a switch 120, which may send a signal (e.g., a wireless or wired signal) to a control unit 110. The control unit 110 may also be locally or remotely controlled and may include, for example, a computer with a microprocessor, memory, and user interface. The control unit 110 may be a discrete control unit, such as, e.g., a laptop, desktop, tablet, or any other suitable device, including, e.g., an application configured to be loaded on a mobile device. The control unit 110 may be connected via wired or wireless network connection 150 to the Internet cloud 140. The control unit 110 may be also connected to the switch 120 via wired or wireless connection 115, and further connected to the outlet 130 via wired or wireless connection 121. Similarly, the switch 120 may be connected to the outlet 130 via wired or wireless connection 118. Each of the control unit 110, Internet cloud 140, switch 120, and outlet 130 may include one or more features of the similar components disclosed in U.S. application Ser. No. 13/672,534, filed Nov. 8, 2012, the entire disclosure of which is incorporated by reference herein. It will be obvious to those skilled in the art that the outlet may be modified to be a device that is included in a junction box or similarly attached to an electrical system and provides power or another utility or resource to a device. By way of example, this could be a device included in a ceiling junction box that is wired to a ceiling fan; a device included inline to power outside flood lights; a device which monitors and may control the flow of natural gas to a furnace, etc.

The system 100 may include other components or enhancements. For example, referring to FIG. 1, the automation system 100 may include one of more sensors 160 connected to control 110 via wired or wireless means 119. The sensors 160 may include any suitable sensing means, including, but not limited to, cameras, motion detectors, IR detectors, RF sensors, bioimpedance sensors, microphones, and contact switches including those which may be used to detect if doors and windows are opened or closed. The sensors may also include sensors available on or for use with computers, laptops, set top boxes, appliances, mobile phones, tablets, etc., which may be connected to control 110 by wired or wireless means. Such sensors may include wearable sensors (e.g., sensors capable of measuring biometrics of an individual), remote cameras or microphones, authenticating sensors (e.g., fingerprint or retina scanners), and the like.

A system, such as, e.g., home entertainment system 145 may be connected to the home automation system 100 via wired or wireless connection 147. The home entertainment system 145 may include one or more of a set top box, an amplifier (which may support any known audio feature and/or functionality, including, but not limited to, surround sound), one or more displays, such as, e.g., monitors or televisions, a stored media player (such as, e.g., a CD, DVD, or compressed file (e.g., MP3) player), a device for receiving streaming content including, but not limited to an Apple TV, or any other suitable devices which facilitate receiving, creating, displaying, viewing, listening, recording, and/or enjoying multimedia. In some embodiments, the home entertainment system 145 may be one or more discrete components operably coupled to one another. In another embodiment, the home entertainment system 145 may be a component having multiple functionalities. The home automation system 100 may also include means to distribute multimedia to various rooms or locations in the building. For example, multimedia may be distributed to components located in remote locations via, e.g., a local access network (LAN) or over a wireless network. Messages from the home automation system 100 to the home entertainment system 145 may control the home entertainment system 145 to adjust volume, brightness, channel, media selection, playback, recording, or any other control which may be executed with a remote control.

Control 110 may be also configured to control other systems or enhancements associated within a home, office, school, or other structure. For example, control 110 may control systems for irrigation, heating and cooling, entertainment, water heating, pool covers, pool pumps, position of window treatments (e.g., blinds, shades, curtains, or other coverings), etc. In addition, control 110 may control one or more safety systems, including, but not limited, a security alarm, a fire detection system, and/or a carbon monoxide or other noxious gas detection system. The switch 120 may also communicate with the outlet 130 via any suitable wired or wireless means 121. Further, switch 120 may be configured to communication with the sensors 160 via any suitable wired or wireless means 123.

With continued reference to FIG. 1, one or more mobile devices 170 (e.g., a mobile phone, tablet, or phablet) may connect to the control 110 via a wired or wireless connection 175. The wired or wireless connections 115, 118, 121, 175, and 119 may use the same or different protocols or standards. In addition to instructions being processed by control unit 110, some or all of the processing could be performed by one or more microprocessors included in the switch 120, the outlet 130, or may be performed by one or more remote servers accessible via the Internet cloud 140. In some embodiments, one or more sensors 160 may include their own processors. In such embodiments, some or all of the processing or pre-processing may be performed by the processors associated with sensors 160. It is understood that the system 100 may include multiple switches 120, outlets 130, mobile devices 170, and/or sensors 160. The one or more outlets 130, one of more switches 120, sensors 160, and one or more mobile devices 170 also may be directly connected to one another via any suitable wired or wireless connections (not shown).

Figure 2:
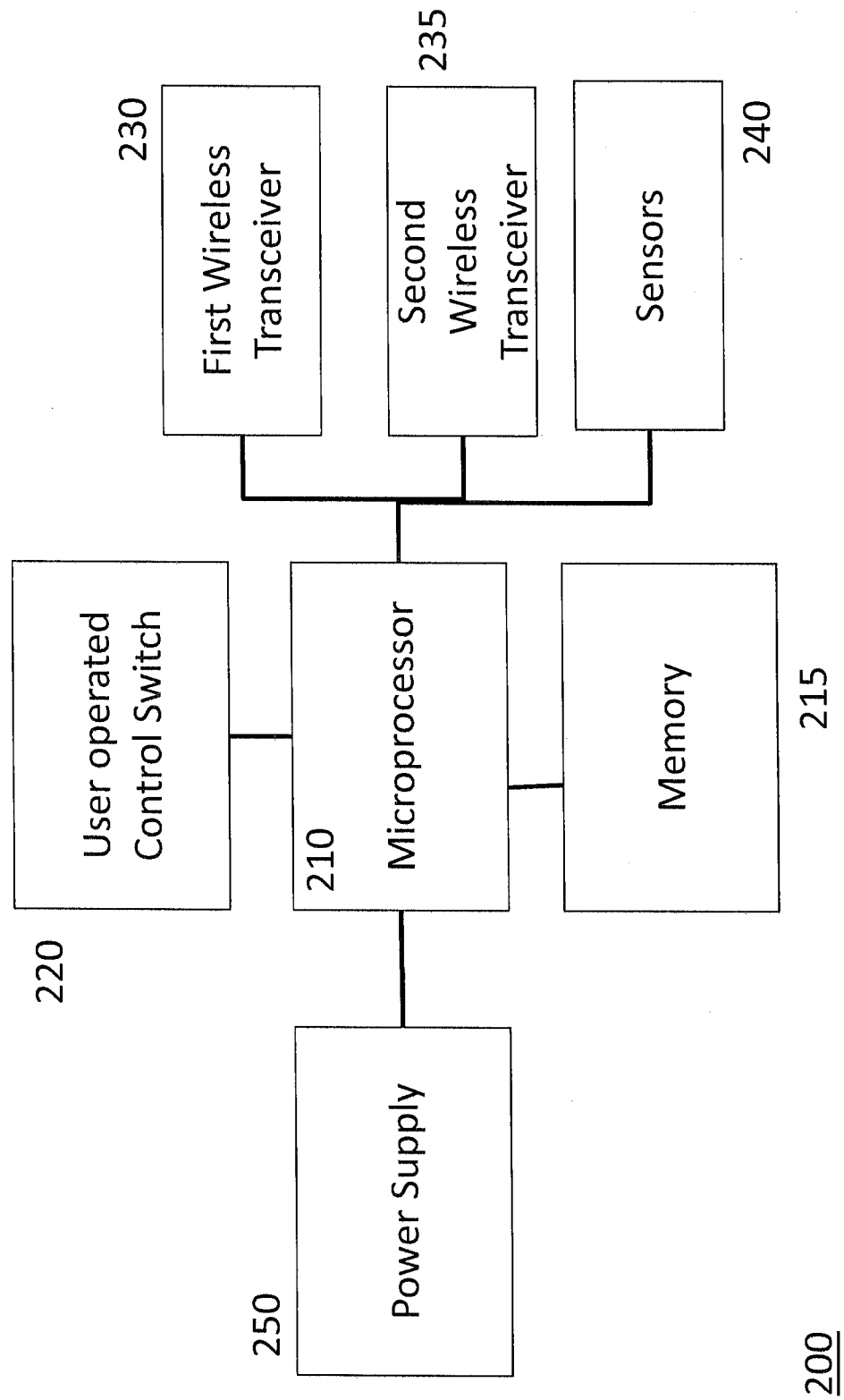
FIG. 2 schematically illustrates an exemplary actuator or switch, in accordance with an embodiment of the present disclosure.

FIG. 2 is a block diagram of an exemplary switch 200 that may be used in conjunction with automation system 100 and may operate as the switch 120 in FIG. 1. In at least some embodiments, the switch 200 may be remotely controlled by, e.g., control 110. As alluded to above, switch 200 may include any of the features of the switch(es) disclosed in U.S. application Ser. No. 13/672,534, filed Nov. 8, 2012, the entire disclosure of which is incorporated by reference herein. For example, the switch 200 may include a microprocessor 210 capable of running software or an algorithm stored in memory 215. Memory 215 may be any suitable solid state or flash memory. The switch 200 may include a user-operated portion 220, which may be a mechanical light switch, or any of various user input devices known in the art, such as, e.g., a touch sensor or push buttons. User-operated portion 220 may be configured to control (e.g., interrupt, adjust, change, terminate and/or meter) the supply of electrical energy to a device or electrical outlet (e.g., outlet 130 shown in FIG. 1) in communication with switch 200. Accordingly, in one embodiment, the user-operated control portion 220 may be configured to transition between an "on" position and an "off" position. In another embodiment, the switch may allow various levels to be indicated by the user discretely or continuously.

The switch 200 may further include a first transceiver 230, for example, an 802.11 Wi-Fi transceiver. The term "transceiver" as used herein should not be construed as limited to any particular structural components. Instead, a transceiver may include any structural components configured to allow for one or both of back and forth communication. Accordingly, the transceivers disclosed herein may include, but are not limited to, antennae, power supplies, communication ports, microprocessor, memory, and any other elements needed to achieve the desired function. The first transceiver 230 may be configured to communicate over any known protocol including, but not limited to, X10, Zigbee®, and/or Bluetooth. Further, although the exemplary embodiment of FIG. 2 depicts the transceiver 230 as a wireless transceiver, those of ordinary skill will readily recognize that first transceiver 230 may be replaced with a wired communication mode. First transceiver 230 may allow the switch 200 to communicate with a control device, e.g., the control unit 110 as shown in FIG. 1. The first transceiver 230 therefore may allow the switch 200 to exchange commands with the control unit 110 of the automation system 100.

In some embodiments, the switch 200 may also include a second transceiver 235 to allow the switch 200 to communicate with one or more devices (e.g., the outlet 130 shown in FIG. 1 or any electrical load coupled thereto) using multiple standards. Both transceivers 230 and 235 may include received signal-strength indicator means to identify the strength of a signal received by the transceiver. The first and second wireless transceivers 230, 235, respectively, may allow for communication over one or more protocols. In addition, the first wireless transceiver 230 may be configured to communicate over a protocol that is different from the communication protocol of the second wireless transceiver 235.

The switch 200 may include one or more sensors 240 configured to detect and respond to various conditions or stimuli, such as temperature, moisture (e.g., water, rain, or humidity), light, sound, air flow, contaminants, motion, or electromagnetic or radio frequencies. Examples of such sensors are disclosed in U.S. application Ser. No. 13/672,534, which is incorporated herein by reference. The switch 200 may also include a power supply 250, which may be any suitable power supply known in the art. In some embodiments, for example, the power supply 250 includes a battery, e.g., a rechargeable battery. It is understood that the power supply 250 in FIG. 2 may schematically illustrate a wired or wireless connection to a power network, such as, e.g., a power grid or transformer. Further, the power supply 250 may include both a battery and a connection to a power network.

The switch 200 may include a microprocessor 210, which may be any suitable microprocessor known in the art. Although FIG. 2 shows the microprocessor 210 located within the switch 200, the microprocessor 210 may also be remotely connected to the switch 200. The microprocessor 210 may be configured to communicate, e.g., exchange control signals, with the one or more sensors 240, the first wireless transceiver 230, the second wireless transceiver 235, and/or the user-operated portion 220. The switch 200 may also include a display, which may be a touch display or graphical user interface, not shown.

Figure 3:
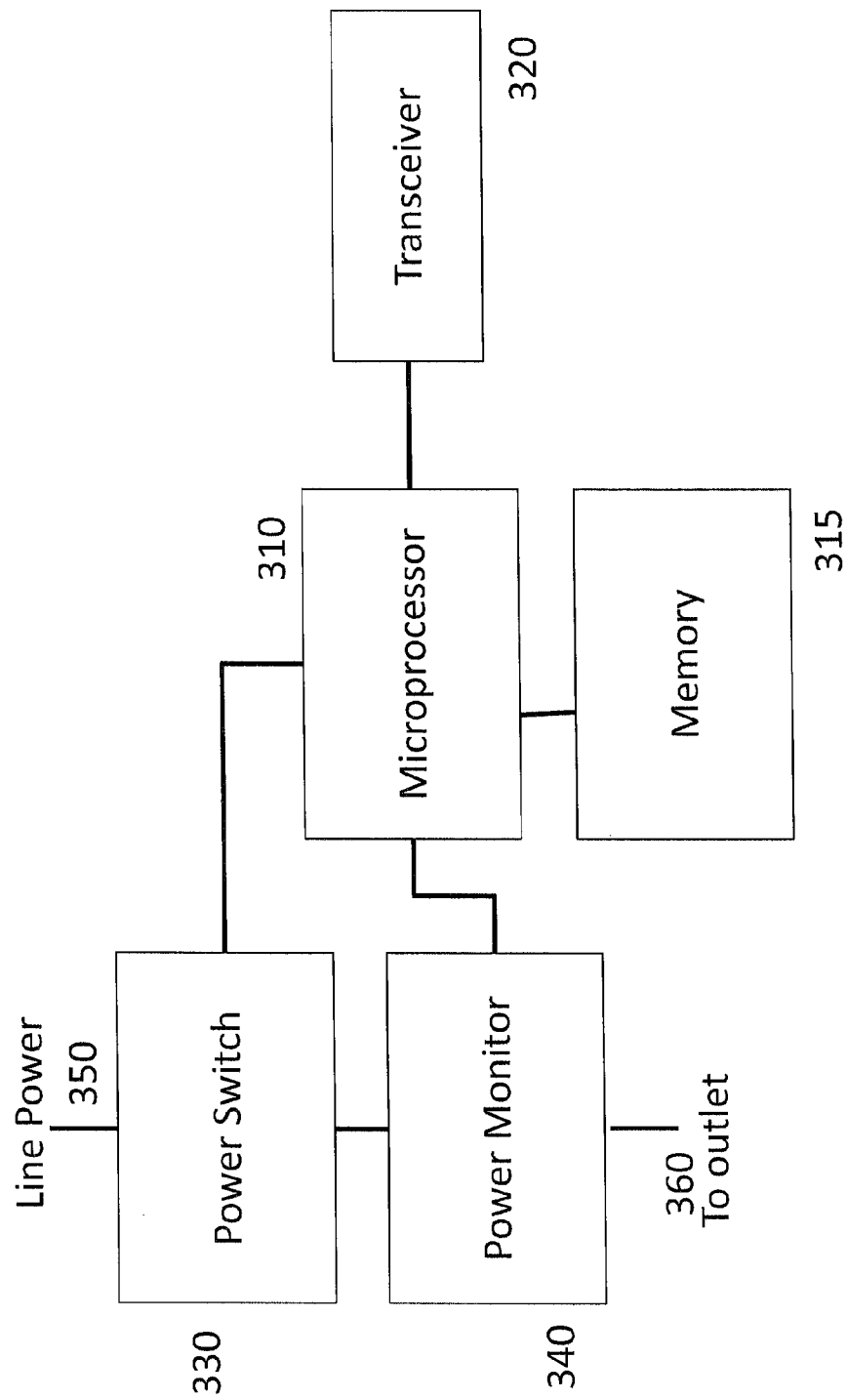
FIG. 3 schematically illustrates an exemplary outlet, in accordance with an embodiment of the present disclosure.

FIG. 3 shows a block diagram of an outlet 300 that may operate as the outlet 130 of the system 100 shown in FIG. 1. In at least some embodiments, the outlet 300 is remotely controlled. As alluded to above, outlet 300 may include any of the features of the outlet(s) disclosed in U.S. application Ser. No. 13/672,534, filed Nov. 8, 2012, the entire disclosure of which is incorporated by reference herein. For example, the outlet 300 includes a microprocessor 310 that runs software or an algorithm stored in memory 315. The microprocessor may be remote to outlet 300 and connected to outlet 300 via any suitable wired or wireless connection or the Internet cloud 140. The outlet 300 further includes a transceiver 320, which may include any of the features described in connection with transceivers 230 and 235 of FIG. 2. The outlet 300 may also include one or more sensors (not shown), which can include motion sensors, ambient light sensors, a camera, a microphone, moisture sensors, or any of the sensors described above with respect to the one or more sensors 240 of FIG. 2 or 160 of FIG. 1.

In some embodiments, the outlet 300 receives electrical energy via a power switch 330 supplied by line power via connection 350. The power switch 330 may be controlled by a microprocessor, e.g., 310, which may include any of the features described with respect to the microprocessor 210 of FIG. 2. The power switch 330 may be configured to connect or disconnect the line power to the outlet 300, including a connected load 360 (e.g., one or more electrical devices coupled to the outlet 300). The power switch 330 also may be configured to reduce a voltage or current delivered to the load 360, thus providing a dimming function.

The outlet 300 may further include a power monitor 340 for measuring the consumption of power by the load 360 connected to the outlet 300. The load 360 may be connected via any suitable means, such as, e.g., standard 2 or 3 pin power outlets, 220V outlets, or international standard outlets, and may also include a wireless connection such as via a wireless charger. The power monitor 340 may transmit measured power data to the microprocessor 310 via the transceiver 320, and may also transmit data to one or more other components or devices of the system 100.

In some embodiments, the power monitor 340 also measures noise in the connection to the load 360 in order to determine the type of energy-consuming device(s) connected, e.g., as explained in U.S. application Ser. No. 13/672,534, which is incorporated herein by reference. This type of analysis is discussed in U.S. Pat. No. 8,094,034. Multiple connections throughout an entire structure may be monitored and analyzed to determine the types of devices such as appliances connected to define the load 360, e.g., by turning the devices on and off. In some embodiments, user activity may be inferred by monitoring a structure, e.g., identifying which loads are activated and deactivated. By monitoring power consumption characteristics at the outlet 300, characteristics of a device connected to the outlet 300 may be determined, e.g., via techniques disclosed in U.S. Pat. No. 8,094,034 or other analytical methods. Based on the power consumption characteristics, the device (e.g., an oven, refrigerator, or fan) may be beneficially and intelligently identified.

Figure 4:
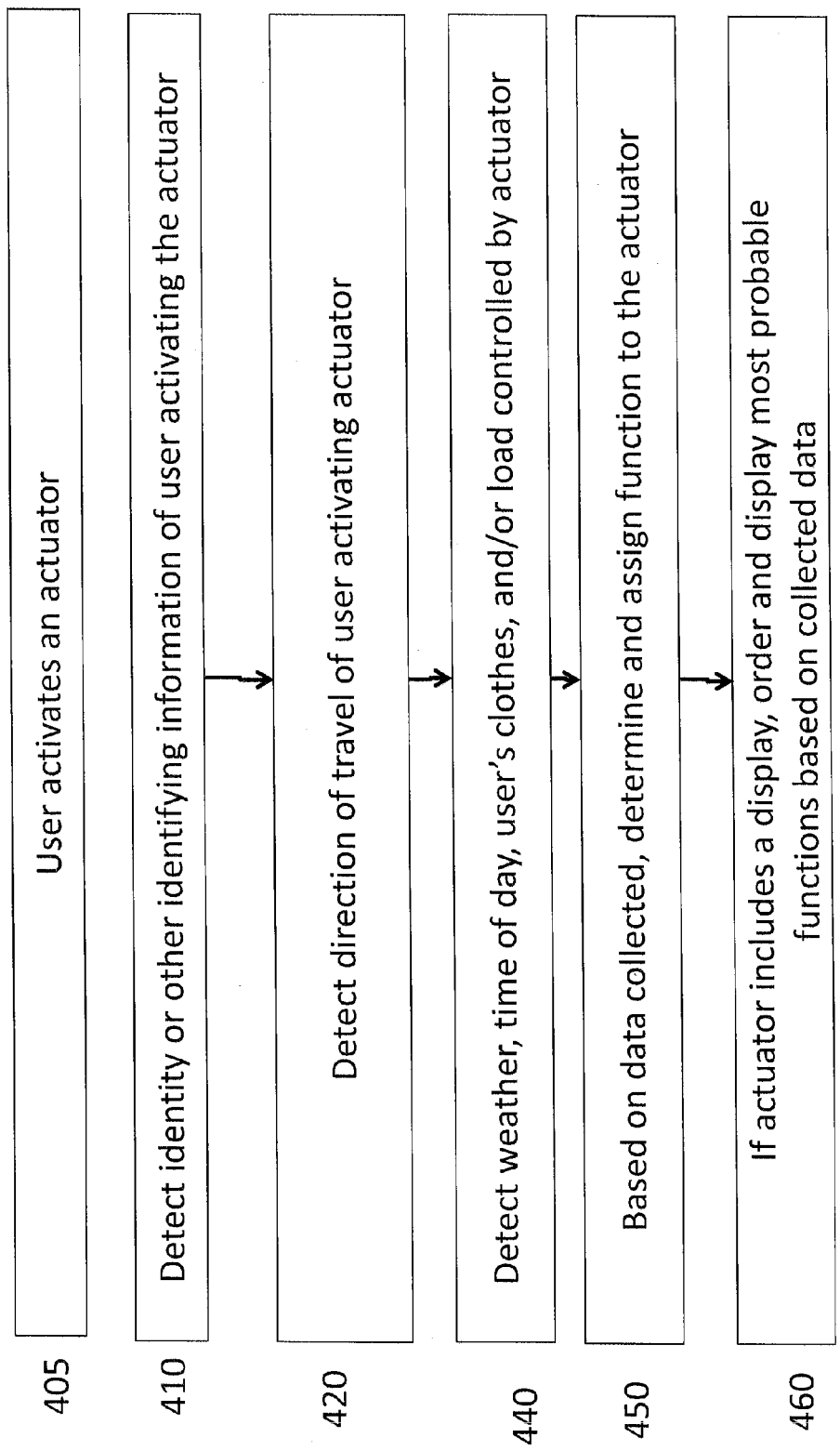
FIG. 4 illustrate an exemplary method, in accordance with an embodiment of the present disclosure.

FIG. 4 depicts a flowchart 400 which preferentially depicts an embodiment for dynamic assignment of functions to actuators of an automation system 100. Flowchart 400 begins at step 405 with a user activating an actuator that controls the power delivery from an outlet or to one or more loads coupled to automation system 100. This step of activating an actuator could be a user toggling a conventional light switch, pushing a button on a component such as switch 120, activating a touch interface on control 110, activating a touch interface on a switch 120, speaking a command detected by any component of the home automation system 100, such as sensors 160 or sensors 240, or otherwise activating or manipulating any other user interface associated with a component of automation system 100.

In step 410, for example, the automation system 100 determines an identity of the user that activated the actuator (e.g., a switch 120). In some embodiments, the identity may include any identifying information, as described in greater detail below. The identity may be determined from data collected by any of the sensors or devices associated with automation system 100.

For example, identifying information about a user may be obtained or determined by a camera (not shown) mounted as one of the sensors 240 in a switch 120. The camera may be configured to capture a picture of a face of the person who activated the switch. More particularly, an exemplary switch may include a motion sensor in one embodiment. As a user approaches the switch 120, the motion sensor may detected the motion of the user and energize the camera associated with the switch. Upon detection of a change of state of the switch, the camera associated with the switch may be configured to take an image of an area predetermined as generally including the user's face. Once an image is captured, it may be compared with a database of pre-stored images of faces. If a match is not made, the captured image may be forwarded to the control 110 and compared against images of faces stored in a memory (not shown) of control 110 or elsewhere within automation systems 100. If a match is still not found, the image may be forwarded to one or more servers in the Internet cloud 140 for comparison against a larger database of faces stored or accessible via the Internet cloud 140. Facial recognition may be executed on the switch 120, or on the control 110, on another device associated with the automation system 100 and could be run in series or parallel on multiple devices at once. The pre-stored images of faces used in the comparisons described above may be generated by any suitable means known in the art. For example, upon installation of a system 100 according to the present disclosure, a database of facial images of known users may be created. The database may be updated each time a new user is likely to actuate the switch 120, or it is known that a current user will no longer be actuating switch 120. In this manner, the principles of the present disclosure contemplate certain security measures associated with controlling or limiting access to the database of facial images available for the comparisons described above. For example, if it is desired to restrict the ability of a user to control a particular switch 120, that user's facial image may be removed from one or more of the described databases.

In another embodiment, the automation system 100 may determine identifying information of the person activating the switch by discovering the identity of a mobile device, such as, e.g., mobile phone 170, carried by the person. The automation system 100 may communicate with the mobile phone 170 using a short range protocol and determine that the mobile phone is in proximity of the activated switch 120, thus deducing that the owner of device 170 probably activated switch 120. In some embodiments, for example, upon activation of the switch 120, the automation system 100 may emit a signal requesting a ping from any nearby mobile phones 170 to respond with location information, and the owner of the phone closest to the switch may be deduced as the person who activated the switch. That is, all mobile phones within range of the switch 120 and receiving the emitted signal may then emit a response signal including identifying information (including, e.g., ownership information), which may be received by the switch 120. In addition, or alternatively, the mobile phone 170 may be configured to periodically or semi-periodically emit a signal including identifying and/or location information. In still further embodiments, mobile phone 170 may be configured to emit a signal including identifying and/or location information upon sensing certain triggers, including, e.g., detection of proximity or location sensors. Thus, in one embodiment, a mobile phone 170 may be configured to detect a proximity sensor as a user enters a room, which causes the mobile phone 170 to emit a signal that may be received by a switch 120, as described above.

Other methods of identifying the user include the switch being capable of capturing a fingerprint from the activating user, and the fingerprint may be used to identify the user. For example, as with the captured image described above, a captured fingerprint may be compared against a database of fingerprints to identify a user. The features discussed above relative to the database(s) of facial images are equally applicable to the database of fingerprints. Embodiments of the switch also may include a microphone, and use voice recognition to identify the user, or identify sounds the user makes such as a specific gait when walking, a noise in a joint when moving, or a pattern of breathing, for example. Other methods of identifying the user with sensor input, including biometric sensors will be evident to those skilled in the art. In further embodiments, switches 120 may be coupled to, e.g., retinal scanners, which may scan the eyes of a user to identify the user actuating a switch. In still further embodiments, users may carry or wear devices configured to emit signals or frequencies unique to particular users. For example, a first user may wear or carry a radiofrequency identification (RFID) tag or device configured to emit radiofrequencies at a first frequency. Similarly, second and subsequent users may wear or carry a radiofrequency identification (RFID) tag or device configured to emit frequencies at unique frequencies different than the first frequency. The switch 120 may be configured to detect the emitted frequencies and compare them to a database of frequencies that identify which user is associated with each frequency. Based on the comparison, the switch 120 may be configured to identify a user based on a frequency emitted by a device worn or carried by the user.

It is possible that in step 410 the automation system 100 may fail to identify the user. A null answer is a valid output for step 410. If the system 100 fails to identify a user actuating the switch 120, operation of the switch 120 may include instructions when the user is not identified.

At step 420, a direction of travel of the user may be determined from one or more sensor inputs. Inputs from sensors configured to detect doors opening and closing, cameras, motion sensors, microphones, and other sensors accessible by automation system 100 or by components of the automation system 100 can be used to determine a direction of travel of the person that activated the switch 120. For example: given a door that connects an interior hallway to a garage, if the door opens and then a switch proximate the door is activated, the automation system 100 may deduce that the person activating the switch has entered the house. Alternatively, if the switch is activated and the door has not been opened, the automation system 100 may deduce that the person did not enter through the garage and approached the switch from the other end of the hallway, e.g., from within the home. In addition, or alternatively, the automation system 100 may monitor the position of a mobile phone 170 or similar device as it is being carried by a user through a structure (e.g., a home) to determine a direction or vector of travel of the user. As described above, the mobile phone 170 may be configured to periodically or intermittently emit a signal that reports a location of the mobile phone 170 to the automation system 100, for example when the mobile device enters a new room, or the mobile phone 170 may be configured to report its location if it is moved more than a specified distance, such as, for example, 10 feet.

More particularly, the automation system 100 may track the location of a mobile device carried by a user by tracking a signal emitted from the mobile device with one or more receivers (not shown) located throughout a structure in predetermined locations. In some embodiments, the receivers may be operably coupled to switches (e.g., switches 120) disposed in a structure. In a further embodiment, the receivers may be disposed within a housing of the switches. For example, the mobile device may be configured to intermittently or periodically transmit a low power wireless signal, such as, e.g., a Wi-Fi, radiofrequency, or infrared signal. Receivers located in at least some of the switches in automation system 100 may receive the signal emitted by the mobile device and measure a strength of the received signal. The switch that receives the strongest signal may be considered by the automation system 100 as being closest mobile phone and the person carrying it. In this manner, as a person may move through a structure, the automation system 100 may be configured to constantly or periodically monitor their movements and/or direction of travel through the structure. Such monitoring may assist in predicting a user's location, which may be used to dynamically change the function assigned to an actuator, such as, e.g., a switch 120.

At step 440, the control 110 or another device connected to the automation system 100 may collect other information including, but not limited to, the time of day, which may be collected from a system time, a global positioning system (GPS), the Internet, a broadcast time source, or another source of real time as is known in the art. The automation system 100 may also gather weather related information, which can be determined, for example, from sensors outside the house, from a broadcast, or from a server on the Internet. In addition, or alternatively, the automation system 100 may determine the clothes or type of clothing being worn by a user activating a switch or of at least one person at the structure of the automation system 100. The clothes or type of clothing worn can be determined from analysis of images taken by camera connected to the automation system 100, or by a near field communication receiver connected to the automation system 100, which can read RFID (radio frequency identification) tags attached to clothing. The RFID tags may be configured to send information indicative of the type of clothing to which the tags are attached. The images discussed in this paragraph may be compared to a database of images as previously described herein.

At step 450, the automation system 100 evaluates at least part of the data collected in steps 410, 420, and 440, against a list of criteria such as the criteria 500 in FIG. 5. The automation system 100 may then determine and assign a function that is predicted to be mapped to the switch 120 that has been activated.

If the switch 120 includes a display (not shown), then one of more of the functions available for assignment to the switch 120 may be displayed to a user, and the user activating the switch 120 may select a desired function for assignment to the switch, or activate an user interface to change a function of the switch 120 to the desired function, step 460.

FIG. 5 lists, for example, different functions that may be applied to a single actuator (e.g., switch 120) inside a house near a door to an attached garage. If, e.g., Mike is walking out of the house and into the garage, which may be determined by the switch being activated without the garage door having been opened, and if no other person is in the house, then activating the switch would preferentially turn off all lights in the house and activate a light attached to a garage door opener, as shown in line 510. In addition, activating the switch may also suspend power delivery to all non-essential appliances or electrical devices coupled to automation devices 100, as explained in U.S. application Ser. No. 13/672,534, filed Nov. 8, 2012, the entire disclosure of which is incorporated by reference herein.

In another example, Johnny has a tendency to go outside to practice basketball. Line 520 shows that if Johnny is walking outside, and triggers or activates the switch, the garage door light may be triggered as in line 510, and the outside lights may be turned on, to enable Johnny to practice basketball. The outdoor lights being turned on may be further dependent on the time of day and the weather such as overcast or sunny and the time of sunset. As explained above, the switch is capable of determining whether Johnny or Mike is activating the switch based on any of the methods of determining an identity of user activating the switch.

In a further example, if Julie walks into an empty house before 10 p.m., the lights in the kitchen and entry way may be turned on, as is shown in 530. However, if Julie walks into an empty house after 10 p.m., all lights between the entry way and Julie's bedroom are turned on as is shown in 540.

If no other criterion is matched, the switch defaults to line 550 and the switch toggles the entryway light. In this instance, the default criteria 550 also includes the case where the person activating the switch is not known.

The entries in table 500 may be created by various means. For example, the criteria may be entered by a user. The automation system 100 may track the pattern of usage of lights, associated with data available to the automation system 100. Different criteria may also be loaded to the system 100 from a server on the Internet as part of a subscription service, or from another automation system 100. The system may track usage and statistics of how the switches are used. If the switch 120 or control 110 being activated has a display, the display may show the most likely functions that will be chosen.

The steps of method 400 may be executed in any suitable order, which may be different than that shown in FIG. 4. For example, the automation system 100 may track the motion of at least one person and anticipate that a switch might be activated. The switch may be mapped to the most likely desired function in anticipation that the switch may be activated to reduce any lag time.

Another embodiment is to control outlets (e.g., outlets 130) of automation system 100 based on sensor input. If a sensor coupled to an outlet determines that a toddler is in the house, in a room, or near an outlet, the automation system 100 may suspend power delivery to the outlet or outlets that the toddler is closest. In some embodiments, the automation system 100 may not suspend power delivery to certain outlets if it is determined that those outlets are delivering power to appliances or devices that cannot tolerate an interruptions in power delivery. Such devices or appliances may include a refrigerator or a ventilator or other medical device. If the toddler moves to another room or portion of the home, the automation system 100 may intelligently re-enable power delivery to the suspended outlets, and disable power delivery to those outlets that are now within a predetermined distance (e.g., 10 or 15 feet) of the toddler. Often a homeowner will need to "baby proof" parts of his/her home before a family or guests visit with small children. The above-described features would automate disabling outlets that a small child could access. The automation system 100 may go into a "toddler mode" that could be scheduled by an authorized user. A sensor available to the automation system 100 may capture a picture of a child, or capture audio that is indicative of a child, or may capture a voice command that orders at least a part of the home automation system into a "toddler mode". In addition, children in a home may be fitted with a device (e.g., an RFID tag) that may be worn as a bracelet, anklet, necklace, may be pinned to clothing, or carried in a pocket. The device may be configured to emit signals that may be detected by outlets or other power delivery components in the home. As a child approaches an outlet, the outlet would detect the signal being emitted by the device carried by the child, and the automation system 100 would temporarily suspend power delivery to the outlet. In some embodiments, however, power delivery may not be terminated if the particular outlet is supplying power to a critical appliance or device that cannot tolerate an interruption in electrical power supply. In some embodiments, power delivery may only be suspended to outlets that do not have appliances plugged into them.

Another embodiment may be to control at least some of the utilities to a guest room. A guest room with a dedicated bathroom may be only used when guests are visiting the homeowner. When the guest is visiting, the automation system 100 may be configured to route HVAC (heating ventilation and air conditioning) to cool or heat the guest room, water would be enabled to the guest room bathroom, and outlets would be enabled. When a guest is not visiting, the HVAC vents maybe closed off to lower the energy cost of cooling or heating the room and the home as a whole. The water maybe turned off to the bathroom to prevent leaks from impacting the homeowner's water bill, and at least some of the outlets maybe disabled to reduce electricity costs. The automation system 100 can detect when guests are in the house and manage the utilities to the guest room without user intervention, or with minimal user intervention. The HVAC maybe adjusted rather than completely disabled when a guest is not present, for example: the thermostat for the guest room maybe set to 70 degrees when the guest room is in use and 55 degrees when a guest is not present.

Another embodiment may include adjusting or otherwise controlling home entertainment system 145 based on the presence and/or actions of individuals in a room having the entertainment system 145. For example, if the automation system 145 determines that a baby is sleeping, the automation system 100 may control the home entertainment system 145 to reduce the volume or simply turn off the home entertainment system 145. The automation system 100 may determine that a baby is sleeping by examining sensor data, such as a baby monitor that may be operably coupled to automation system 100, or a microphone input that detects sounds of a sleeping baby, or based on a predetermined nap schedule programmed into automation system 100. The automation system 100 may also set the volume depending on the identity of who is watching. For example, if an elderly individual is watching TV, the volume maybe increased to a level to accommodate any hearing impairments. The identity of a user watching TV may be determined in accordance with the principles disclosed herein.

Another embodiment would be to terminate power delivery to appliances if the house is left empty. For example, a clothes dryer may be running while individuals are within a home. As the last individual leaves the home, the dryer may be turned off. When a person returns to the home, the dryer maybe reactivated. In some embodiments, the reactivation may occur after a time delay.

In another embodiment, a switch 120 may have prior knowledge of, operably coupled with, or otherwise paired with at least one or more outlets such as, e.g., an outlet 130, in an area of a building, such as two outlets in the same room as the switch. Activating the switch may cause the switch to determine if any lighting devices or other loads are attached to the at least one outlet, and to toggle the power to the light fixtures or otherwise control delivery to the lighting devices or other loads. Thus, if furniture and/or the lighting devices are moved and unplugged from a first outlet and plugged into a second outlet, the automation system may intelligently and automatically remap the light switch to turn continue controlling the lighting devices now coupled to the second outlet.

Thus, the methods presently disclosed, e.g., method 400, enable a user to benefit from switches and controls that dynamically change function depending on how the users are moving, which user is activating the switch or control, the weather, the time of day, and/or the type of load being controlled by the switch, etc. For example, if a user is wearing a bathing suit and moving through a home in a direction of a pool, activating a switch may cause the pool lights to turn on, but if the same user is wearing shorts and a shirt and activates the same switch, the lights on the patio by the barbeque may turn on. Thus, the home automation system can adapt to the persons and how they typically live or work in the location to better anticipate the persons needs.

In a further example, an exemplary automation system 100 may be used to intelligently control, e.g., an office suite. The office suite may include a main entrance and a number of workers that work within the office suite. In accordance with the principles of the present disclosure, as a first worker arrives at the office suite at, for example, 7 a.m., the worker would access the suite by unlocking the main entrance. A camera or other sensor at the entrance would detect the identity of the worker in accordance with the present disclosure. In one embodiment, for example, a camera may take a picture of the first worker and compare the image to a database of images to identify the worker. In another embodiment, a sensor at the entrance may detect a signal emitted by a device being carried by the worker. For the purposes of the present example, it is assumed the automation system 100 identifies the first worker as individual named Rolando.

The automation system 100 may then intelligently activate the lights and other office equipment in Rolando's office. In some embodiments, the automation system 100 may also activate lights and office equipment (e.g., fax machines and copiers) in general areas of the office suite. However, based on historical data, automation system 100 is aware that the next worker is unlikely to arrive for more than, e.g., 1 hour, the automation system 100 may delay activating the lights and equipment in the general areas. Further, the automation system 100 may gather weather-related data and, if necessary, activate auxiliary heating or cooling equipment in Rolando's office. Further, if pre-programmed that Rolando typically brews a pot of coffee, automation system 100 may activate the coffee maker in anticipation of Rolando's actions.

When another worker arrives at the office suite, the automation system 100 detects the second worker and, upon that worker unlocking the door to the office suite, the automation system 100 may activate lights and equipment likely to be used by that worker. Conversely, lights and equipment particular to certain workers may be deactivated as automation system 100 detects workers leaving the office suite at the end of day.

It is understood that the present disclosure is not limited to the particular forms, embodiments and examples illustrated. The method and apparatus of the disclosure can be practiced with and modifications and variations that do not depart from the spirit and scope of the disclosure.

Embodiments of the present disclosure may be used in connection with any structure, including, but not limited to, homes, offices, business, schools, parking lots, parking structures, churches, sporting complexes. In addition, at least certain aspects of the aforementioned embodiments may be combined with other aspects of the embodiments, or removed, without departing from the scope of the disclosure.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

We claim:

1. A method of assigning a function to an actuator of an automation system of a structure, the actuator controlling delivery of electrical energy to a first electrical outlet configured to operably couple to or decouple from a first electrical device, the automation system including at least one sensor, the method comprising:
   obtaining information relating to a user that has actuated the actuator; and
   changing the function of the actuator based on the obtained information, wherein, if the first electrical device is decoupled from the first electrical outlet and coupled to a second electrical outlet different from the first electrical outlet, the automation system is configured to reconfigure control of the actuator to control delivery of electrical energy to the second electrical outlet instead of the first electrical outlet.

2. The method of claim 1, wherein the information obtained includes identifying characteristics of the user that has actuated the actuator.

3. The method of claim 1, wherein the at least one sensor includes a camera, and the information includes an image of the user's face.

4. The method of claim 2, wherein the information obtained includes information relating to clothing worn by the user.

5. The method of claim 1, further comprising obtaining information relating to a time of day.

6. The method of claim 2, wherein the information obtained includes a direction of travel of the user.

7. The method of claim 2, further comprising determining whether additional users are located within the structure.

8. The method of claim 1, further comprising obtaining information relating to weather outside the structure.

9. The method of claim 1, wherein the actuator includes a display, wherein the display is configured to show the user at least two functions capable of being assigned to the actuator, wherein at least one of the functions is determined by the obtained information.

10. The method of claim 1, wherein assignment of a function to an actuator is preprogrammed into the automation system.

11. The method of claim 1, wherein the at least one sensor is configured to detect a signal from a device carried by the user.

12. The method of claim 11, wherein the signal includes identifying characteristics of the user.

13. The method of claim 6, wherein obtaining information includes detecting signals emitted by a mobile device carried by the user.

14. A method of changing a function of an actuator of an automation system of a structure, the method comprising:
assigning a first function to the actuator, wherein the actuator includes an electrical switch and the function includes controlling delivery of electrical energy to a first electrical device of the structure, wherein activating the actuator a first time interrupts delivery of electrical energy to the first electrical device, wherein activating the actuator a second time re-enables delivery of electrical energy to the first electrical device, and wherein the first electrical device includes at least one light emitting device coupled to a first electrical outlet controlled by the actuator;
obtaining information relating to one or more users associated with the structure; and
assigning a second function to the actuator based on the obtained information, wherein the second function includes controlling delivery of electrical energy to a second electrical device of the structure,
wherein, if the at least one light emitting device is decoupled from the first electrical outlet and coupled to a second electrical outlet different from the first electrical outlet, the automation system is configured to reconfigure the actuator to continue controlling the light emitting device.

15. The method of claim 14, wherein the automation system includes at least one sensor.

16. The method of claim 14, wherein the information obtained includes identifying characteristics of a user that has actuated the actuator.

17. The method of claim 15, wherein the at least one sensor includes a camera, and the information includes an image of the user's face.

18. The method of claim 14, wherein the information obtained includes information relating to clothing worn by a user.

19. The method of claim 14, further comprising obtaining information relating to a time of day.

20. The method of claim 14, wherein the information obtained includes a direction of travel of the user within the structure.

21. The method of claim 14, further comprising obtaining information relating to weather outside the structure.

22. The method of claim 14, wherein the actuator includes a display, wherein the display is configured to show the user at least two functions capable of being assigned to the actuator, wherein least one of the functions is determined by the obtained information.

23. The method of claim 15, wherein the at least one sensor is configured to detect a signal from a device carried by the user.

24. The method of claim 23, wherein the device is a mobile phone.

25. The method of claim 23, wherein the signal includes identifying characteristics of the user.

* * * * *